May 31, 1955   D. C. NEAL   2,709,329
COMBINE HAVING SIDE HILL PLATFORM ADJUSTMENTS
Filed Dec. 26, 1951   7 Sheets-Sheet 1

INVENTOR.
David C. Neal
BY
Greek Wells
Atty.

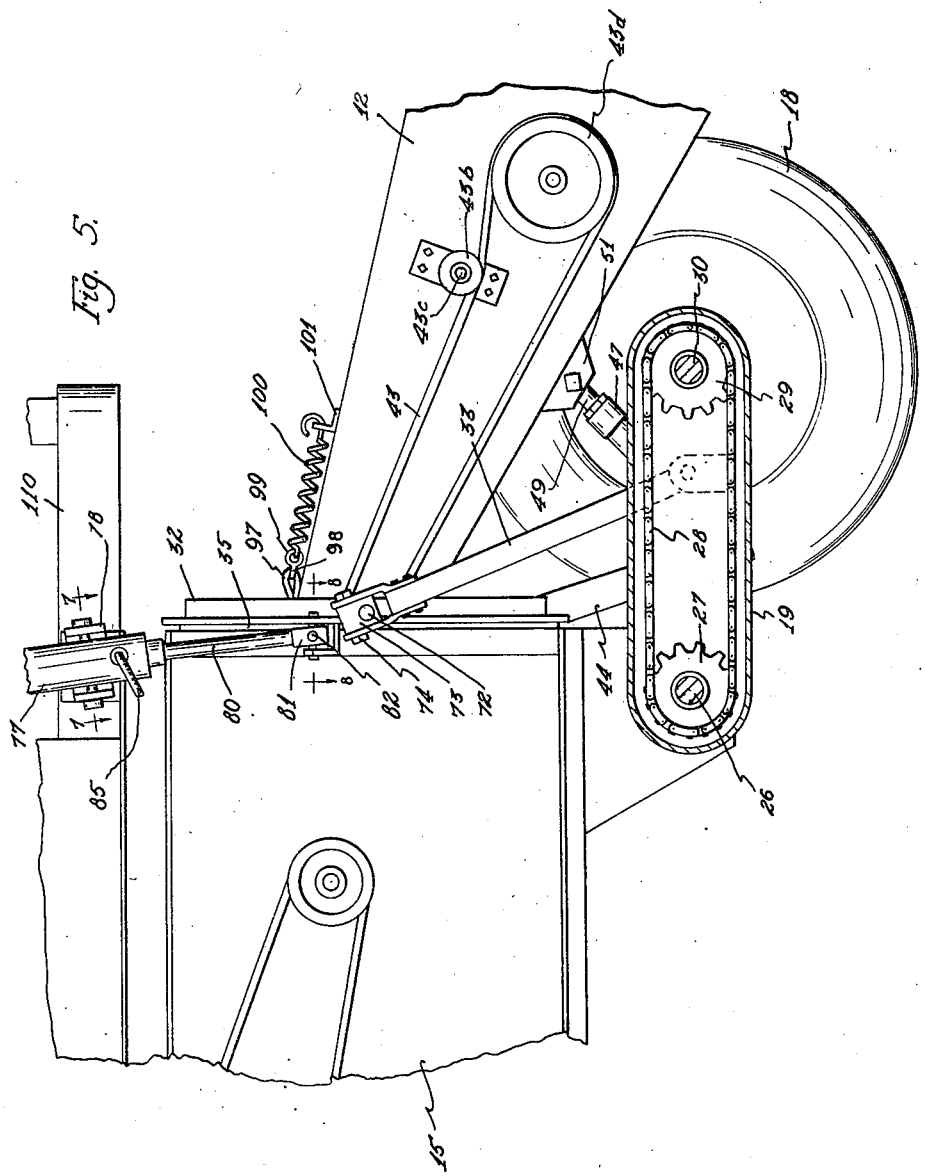

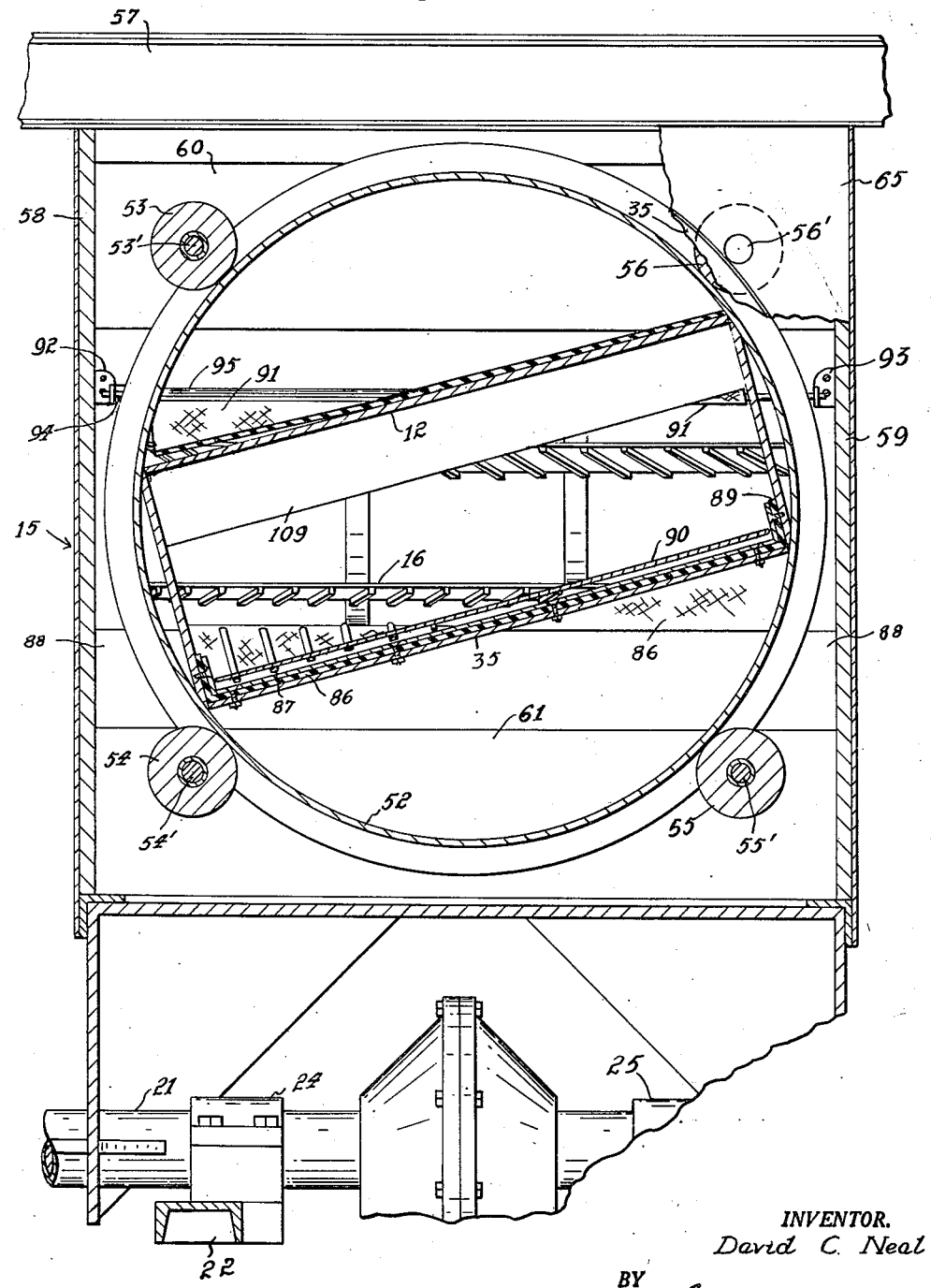

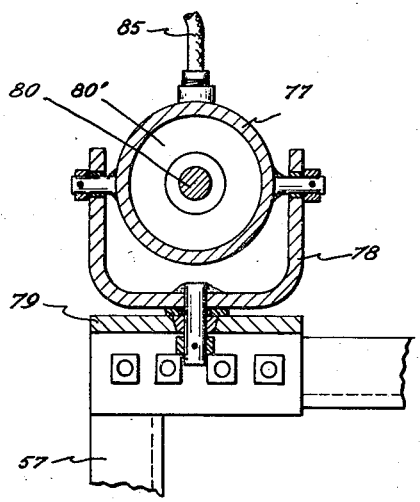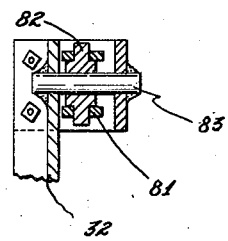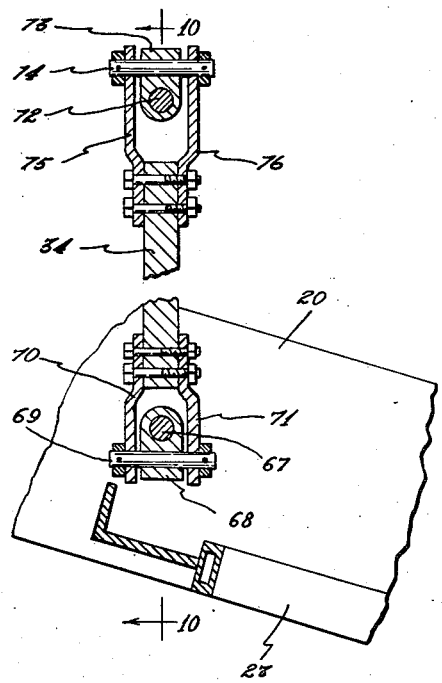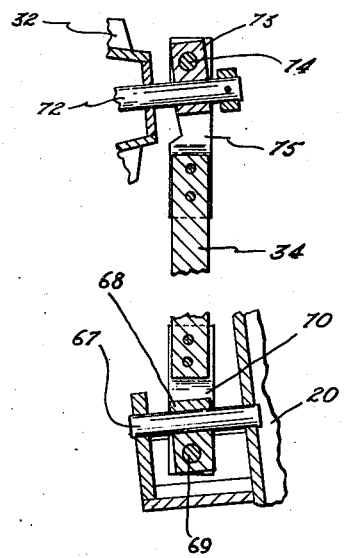

United States Patent Office 2,709,329
Patented May 31, 1955

2,709,329

COMBINE HAVING SIDE HILL PLATFORM ADJUSTMENTS

David C. Neal, Garfield, Wash.

Application December 26, 1951, Serial No. 263,137

14 Claims. (Cl. 56—209)

The present invention relates to improvements in combine having side hill platform adjustments.

In the harvesting of crops on hilly land where a combined cutting and threshing mechanism is employed it is desirable that the cutting mechanism, usually a header, be allowed to follow the contour of the ground quite closely. However, the threshing and separating mechanism operates best when it is maintained substantially level. There are many devices for maintaining the threshing and separating mechanism level and the header and thresher have been combined in a single self propelled unit so that the header can be made to follow the ground contour while the separator is maintained substantially level. In the modern combine harvester, it is customary to employ a header unit which cuts the crop and feeds it into a spout that extends upwardly and rearwardly into the front end of the separator. The problems that have caused the greatest difficulty are the problem of keeping the header at the same angle that the supporting wheels on the ground make with the horizontal and the problem of feeding the cut crop from the header spout to the cylinder where the initial threshing takes place in the separator.

It is the purpose of my invention to provide in a combination harvester a novel mechanism for mounting the header to the front end of the separator and supporting the header unit from the wheels at the front of the separator so that the header unit at all times follows the slope of the ground as it is indicated by the wheels rolling on the ground, the separator being leveled by a single control mechanism that is operated manually or by some known automatic means. My invention contemplates the combination with the front wheels of the harvester of a supporting turret that carries the header and its spout and that also carries the front end of the separator, the front end of the separator being swivelled or pivoted to the turret so that it may rotate on the turret to keep the threshing and separating mechanism therein substantially level throughout all the variations in ground slope that the wheels may encounter. It is also necessary in this connection to provide means to orient the crop that is cut and elevated by the header spout so that the crop will enter the separator cylinder in a substantially uniform thickness across the cylinder. In order to so direct the cut crop to the cylinder, I provide a flexible throat between the upper end of the header spout on the turret and the inlet to the cylinder, the throat being capable of twisting into a more or less spiral shape that changes continuously in response to changes in the ground slope.

In the preferred embodiment of my invention the front wheels are preferably the drive wheels of the combine harvester. Each wheel mounts a supporting arm which extends rearwardly therefrom and connects to the drive axle which is supported from the separator. Power is supplied to the drive axle from a suitable power unit on the separator and a flexible drive is carried by the arms from the axle to the wheels. With this construction the wheels may have individual brakes of any well known type and each wheel may move up and down with respect to the drive axle without interfering with the power transmission to the wheels.

The arms that are supported by the wheels have upright supports connected thereto and these supports carry, at their upper ends, a turret member which mounts the header and the header spout. The turret member also supports the front end of the separator so that the separator may be turned on the turret to keep the separator in a substantially vertical position at all times.

The nature and advantages of my invention will appear more fully from the following description and the accompanying drawings wherein a preferred embodiment of the invention is disclosed. The drawings and description are illustrative only however, and are not intended to limit the invention except insofar as it is limited by the claims.

In the drawings:

Figure 5 is a sectional view taken on the line 5—5 of Figure 4;

Figure 6 is an enlarged sectional view taken on the line 6—6 of Figure 1 with parts broken away;

Figure 7 is an enlarged fragmentary sectional view taken on the line 7—7 of Figure 5;

Figure 8 is an enlarged fragmentary sectional view taken on the line 8—8 of Figure 5;

Figure 9 is an enlarged fragmentary sectional view taken on the line 9—9 of Figure 2;

Figure 10 is a fragmentary sectional view taken on the line 10—10 of Figure 9;

Figure 11 is an enlarged fragmentary sectional view taken on the line 11—11 of Figure 2; and Figure 12 is a fragmentary sectional view taken on the line 12—12 of Figure 2.

Figure 1:
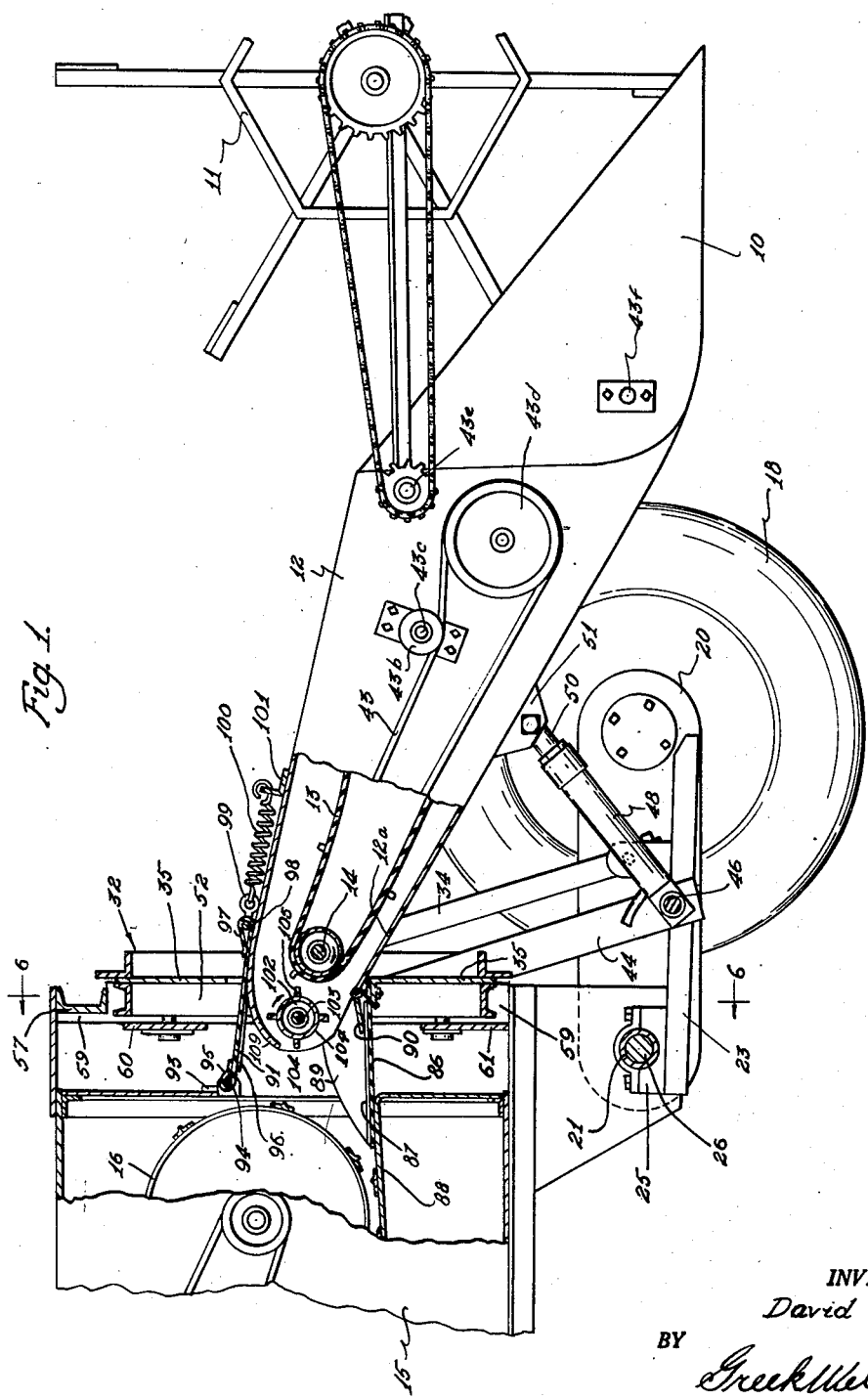
Figure 1 is a view partly in side elevation and partly in section showing the header and the front end of the separator of a combine harvester embodying my invention.

Referring now in detail to the drawings and in particular to Figure 1, my invention is shown in connection with the header and separator units of a well known model of a modern self propelled combine harvester. The header unit 10 of this machine embodies the usual reel shown at 11, a cutter bar not shown, and gathering screws not shown, that gather the cut crop and feed it into a header spout 12. The header spout has suitable mechanism therein including a floating elevator conveyor 13 for elevating the cut crop to the upper end of the header spout. A drive shaft 14 extends through the header spout and furnishes the drive power for the conveyor 13 and the various other moving parts of the header. This mechanism is well known in the art and forms no part of my invention.

The separator is indicated at 15, and it has a cylinder 16 to which the cut crop is fed for the beginning of the threshing and separating operation. It is desirable for the efficient functioning of the separator 15 to have this separator substantially level at all times, that is, it should not be permitted to tip to one side or the other, otherwise the threshing is impaired. However, it will be appreciated that the header 10 must, where it is cutting crops close to the ground, follow the slope of the ground, otherwise a considerable part of the crop may be missed and left on the ground.

According to my invention I support the front end of the separator 15 and the entire header mechanism 10 from two wheels 17 and 18 in such a fashion that the header 10 follows a line that is substantially parallel to a line from the bottom of one wheel to the bottom of the other wheel. The construction is such that the header is close to the front wheels. Thus any change in the slope of the ground encountered by the front end of the header is very quickly reflected by the wheels themselves. The wheel 17 supports the front end of a supporting arm 19 and the wheel 18 supports the front end of a supporting arm 20. The rear ends of the arms 19 and 20 are connected to an axle 21 that is rigidly connected to the separator 15. The arms 19 and 20 are braced by diagonal braces 22—23 respectively, these braces being pivoted on the axle 21 by bearings 24 and 25. The arms 19 and 20 are of course, pivotally mounted on the axle 21. Motive power is supplied to each of the wheels 17 and 18 through shaft 26 in the axle 21, to a drive sprocket 27 on each shaft 26, a flexible drive member 28 and a sprocket 29 for the shaft 30. As shown, the arms 19 and 20 are hollow so as to enclose the parts 27, 28 and 29. With this construction individual control brakes (not shown) may be provided for the brake drums 31 of the wheels 17 and 18 in the same manner as they are provided for the front wheels of automotive vehicles.

In order to support the front end of the separator 15 and the header 10 from the wheels 17 and 18, I provide a framework 32 and support it by two upright arms 33 and 34 from the support arms 19 and 20. The upright arms 33 and 34 support the framework 32, hereinafter called the "turret." The turret 32 in turn supports both the header and the separator. The header is free to rock up and down about an axis on the turret and the separator is free to rotate on a horizontal axis about the center of the turret 32.

Figure 2:
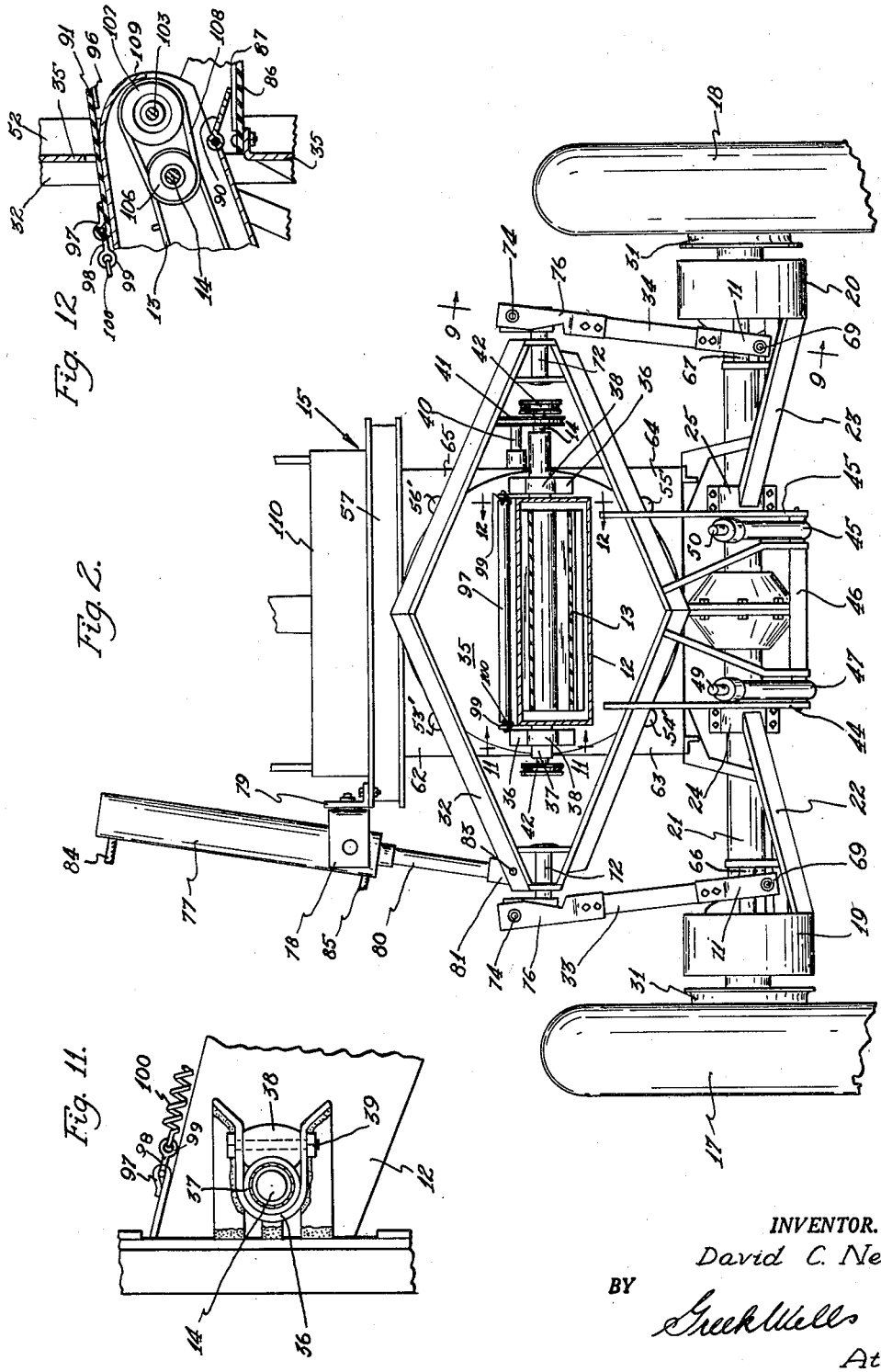
Figure 2 is a front sectional view of the harvester with the header broken away so that only a portion of the header spout next to the separator inlet is shown.

The means for mounting the header 10 to the turret 32 comprises a plate 35 forming part of the turret 32 and a pair of yokes 36 on the plate 35. The yokes 36 receive bearings 37 for the shaft 14 which extends through the bearings to provide the necessary connections for transmitting power to the header mechanism from a power source on the separator. Members 38 hold the bearings 37 in the yokes and these members are secured by bolts 39 (see Figure 11). As indicated in Figure 2, a power driven shaft 40 on the separator 15 is connected by a flexible drive 41 to the shaft 14 and the shaft 14 has drive wheels 42 thereon to drive flexible members 43 and 43a that supply power to the moving parts of the header. The bearing members 37 are fixed on the spout 12 of the header and are free to rotate in the yokes 36. The member 43 drives a pulley 43b which is on a shaft 43c that carries the conveyer 13. The member 43 also drives a pulley 43d which operates a feeder (not shown) to feed the cut crop to the conveyor 13. The member 43a drives a cross shaft 43e that extends full length of the header and operates the reel 11 and through connections not shown the shaft 43c drives a shaft 43f for the gathering screws, and also furnishes power for the sickle.

The turret 32 also has forwardly and downwardly extending arms 44 and 45 that are connected by a cross frame 46. The cross frame 46 mounts two hydraulic cylinders 47 and 48 which have piston rods 49 and 50 that are pivoted to brackets 51 on the underside of the header spout 12. The cylinders and pistons are supplied with hydraulic fluid in the usual fashion for swinging the header up and down about the pivots provided by the yokes 36.

The separator 15 and its axle 21 are carried on the turret 32 by a channel ring 52, that is fixed to the plate 35, and four rollers 53, 54, 55, and 56, that are secured in the front end of the separator. A cross beam 57, side plates 58 and 59, cross tie plates 60 and 61 and front plates 62, 63, 64 and 65 serve to mount the shafts 53', 54', 55' and 56' of the rollers in the front end of the separator 15. The upper rollers 53 and 56 are the principal supporting rollers for the separator since the weight of the front end of the separator rests on the ring 52. The rollers 54 and 55 are merely guide rollers.

Figure 3:
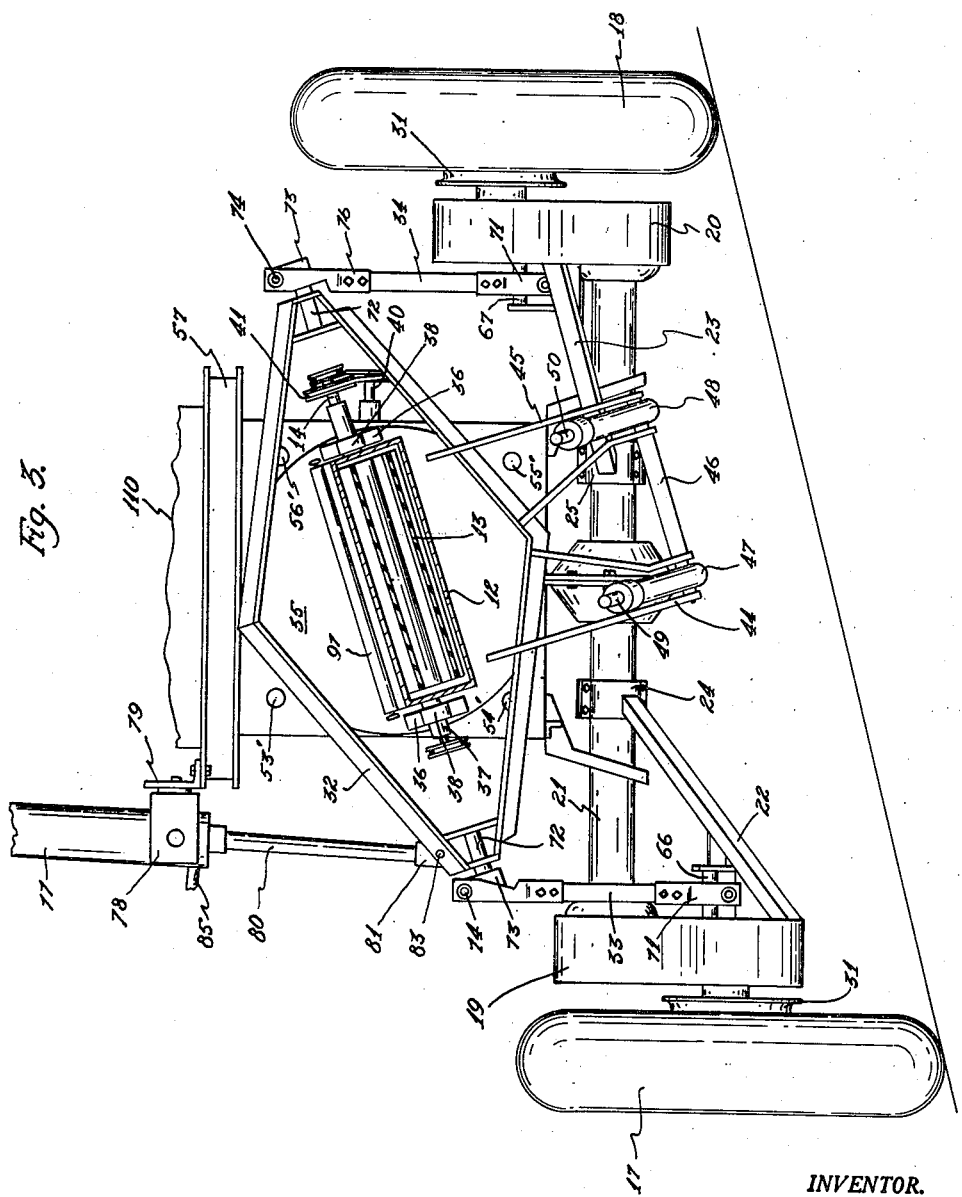
Figure 3 is a view like Figure 2, showing the parts in the position they take when the wheels of the harvester are on a slope and the separator is level.
Figure 4:
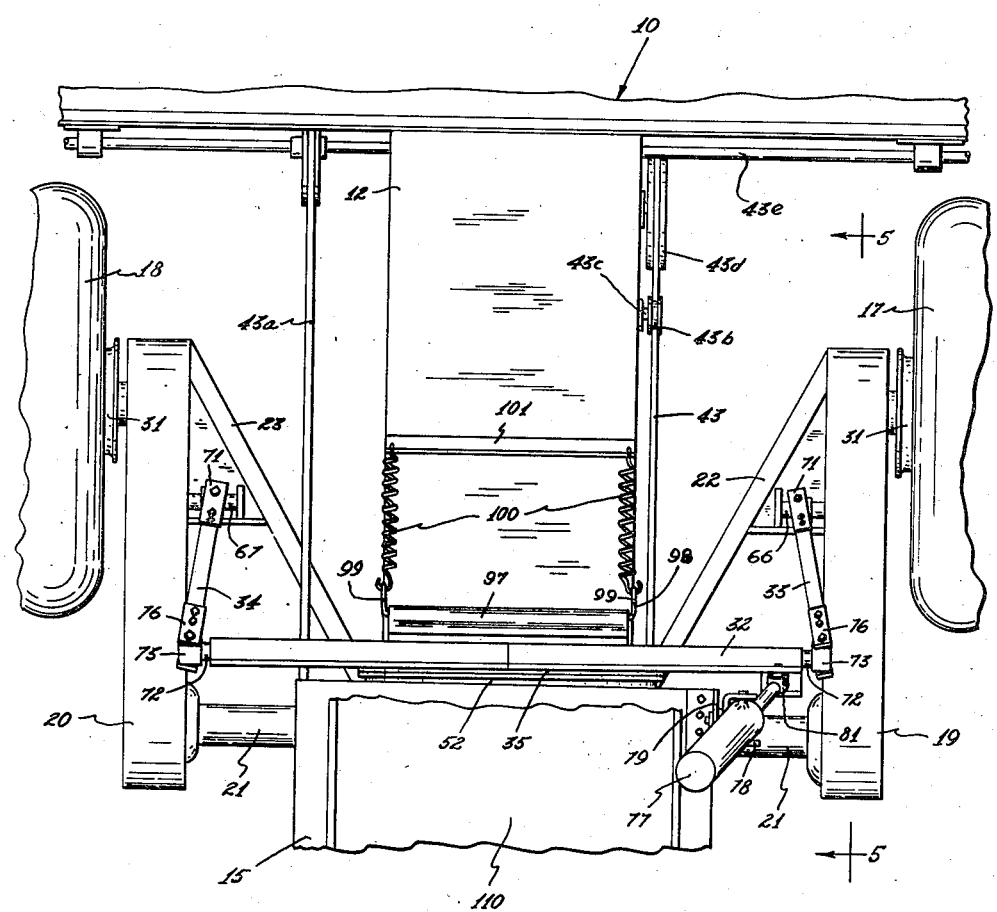
Figure 4 is a plan view of the front end of the harvester, the front portion of the header and the rear portion of the separator being broken away.

As best illustrated by Figures 2 and 3, the turret 32 turns about its center in response to changes in the respective levels of the wheels 17 and 18. The arms 33 and 34, that support the turret 32, must be so mounted on the turret and on the support arms 19 and 20 as to cause proper angular movement of the turret in response to up and down movement of the wheels. The arms 33 and 34 are suspended from the support arms 19 and 20 by stub shafts 66 and 67 (see Figures 9 and 10) on the arms 19 and 20. These stub shafts are set back from the axles of the wheels 17 and 18 a distance that is calculated to give the necessary angular movement to the turret 32 in response to wheel rise and fall to make the front end of the header 10 stay substantially parallel with the ground line between the wheels 17 and 18. Each of the shafts 66 and 67 pivotally mounts a block 68 which in turn carries a stub shaft 69 that mounts the lower end of one of the upright arms 33 or 34. As shown best by Figures 9 and 10, each of the arms 33 and 34 is bifurcated at its lower end to provide portions 70 and 71 to receive the shaft 69. With this connection an upright arm can swing about its supporting shaft 66 or 67 in two directions thereto.

At the upper ends of the arms 33 and 34, links similar to those just described are utilized to mount the upper ends of the arms to the turret 32. A shaft 72 is provided at each end of the turret. This shaft is suspended by a block 73 from a shaft 74 that is mounted by the portions 75 and 76 at the top end of each upright arm.

It will be observed from Figure 2 that when the wheels 17 and 18 are on level ground, the upright arms 33 and 34 converge downwardly from their connection with the turret 32 to their connection with the support arms 19 and 20. This is done in order that the arms 33 and 34 will not be spread apart at their lower ends excessively when the turret is rotated due to the wheels 17 and 18 being raised or lowered with respect to each other. As shown in Figure 3, when the wheels 17 and 18 are on the slope indicated, the upright arms 33 and 34 are substantially vertical.

The leveling of the separator 15 is readily accomplished by utilizing a single leveling mechanism that connects the separator frame to the turret 32. As shown, this leveling mechanism is an expansible link which comprises an hydraulic cylinder 77 that is pivoted at its lower end in a yoke 78 that is swivelled to a bracket 79 on the separator. A piston rod 80 extends downwardly from the cylinder and is connected by a yoke 81, a block 82 and a cross shaft 83 to the turret 32. The details of the mounting of the cylinder 77 on the separator is shown most clearly in Figure 7 and the details of the connection of the piston rod 80 to the turret 32 are shown in Figure 8 of the drawings. The piston 80' on the piston rod 80 is, of course, moved up and down by supplying hydraulic fluid to the cylinder 79 from a suitable source through connections 84 and 85.

It is believed to be clear from the foregoing description how the header 10 is made to follow the slope of the ground as indicated by the rise and fall of the wheels 17 and 18. The wheels remain substantially vertical so long as the separator is kept substantially level because the wheels move up and down in planes at right angles to the axle 21.

The spout 12 rotates at the front end of the separator 15 in response to turning movements of the header with respect to the horizontal position. Since the header is supported entirely from the turret 32, it can be moved up and down to cut the grain higher or closer to the ground. The device is not complete, however, without the additional features illustrated in Figures 1 and 6 in particular by which the grain cut and elevated through the header spout is distributed to the cylinder 16 of the separator. It is obvious that when the header is cutting the grain on a slope, the upper end of the spout 12 will be inclined to the horizontal so that the shaft 14 and the cylinder 16 are not in parallel horizontal planes. The cut crop is discharged from the header spout and if the spout is not level the crop would tend to pile up heavier at one end of the cylinder than at the other. According to my invention, I provide a flexible throat leading from the upper end of the header spout 12 to the cylinder, one end of the throat being secured to the header spout and the other end being secured to the separator in front of the cylinder so that as the header spout turns, the throat will twist and provide a guide that spirals more or less to feed the cut crop to the cylinder.

Referring now to Figures 1 and 6, I provide a flexible lower floor sheet 86 on the plate 35 of the turret 32. This floor sheet 86 is preferably constructed of rubber belting and has spaced bars 87 extending rearwardly from the plate 35 to the rear end of the sheet 86. The rear end of the sheet 86 overlaps a cross partition 88 in the separator immediately beneath the cylinder 16. The sides of the sheet 86 are turned up as indicated at 89. The lower front end 12a of the header spout has a pivoted lip 90 that overlies the sheet 86 and can move endwise on the bars 87 as the header is raised and lowered. The flexible throat is completed by providing a cover sheet 91 over the header spout 12 where it passes through the plate 35. This cover sheet 91 is of the same material as sheet 86. It is fastened to the separator by two brackets 92 and 93 that are mounted at the sides of the separator and a rod 94 that has its ends mounted in the bracket. The sheet 91 is provided with a loop 95 through which the rod extends. The sheet 91 has reenforcing bars 96 thereon similar to the bars 87 on the sheet 86. The sheet 91 extends through the plate 35 and has a loop 97 over a cross rod 98. The cross rod 98 has end portions 99 that are connected to springs 100. The springs 100 are secured to an angle iron 101 that extends across the top of the header spout 12. With this construction it is evident that the cover sheet 91 can be kept taut by springs 100.

Whenever the turret 32 turns out of horizontal position, it twists the flexible throat composed of the sheets 86 and 91. Any crop fed onto the sheet 86 from the header spout 12 will be gradually leveled as it approaches the cylinder 16. The bars 87 and 96 prevent the sheets 86 and 91 from sagging and do not interfere with the twisting of the sheets to accommodate for the changing positions of the header spout.

In order to supplement the feeding action of the conveyor 13, I provide a rotating feed member 102 at the upper end of the header spout. Referring now to Figures 1 and 12, in particular, this feed member 102 is secured on a shaft 103 which is journalled in the end of the header spout. The shaft 103 carries a cylinder 104 which has ribs 105 thereon for feeding the grain from the conveyor 13 toward the cylinder 16. The shaft 103 is driven from the shaft 14 by a pulley 106 on the shaft 14, a pulley 107 on the shaft 103 and a V-belt 108 around the pulleys. The pulleys 106 and 107 and the belt 108 are so constructed as to rotate the feeder 102 at substantially the same peripheral speed as the speed of the conveyor 13. In order to prevent the return feed of material into the header spout, the front hood of the header spout extends down over the feeder 102 as indicated at 109.

When my improved harvester is utilized to cut crops, the control by the operator is very simple. All he has to do to maintain the header and separator in the proper relation to each other is to control the flow of hydraulic fluid to the cylinder 77 so as to maintain the separator substantially level. The operator's platform is usually at 110, directly over the separator, so that he needs no instruments to tell him when the separator tips transversely. His own sense of balance will do that. The header 10 automatically follows the wheels because it is carried by the turret 32 and the ends of the turret are carried by the wheel arms 19 and 20 and the arms 33 and 34. The distance of the header from the ground is of course, controlled in the usual fashion by the cylinders 47 and 48 and their pistons 49 and 50.

Having thus described my invention, I claim:

1. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level in combination with a guide throat for orienting the cut crop from the header spout to the level position of the separator housing, said throat comprising upper and lower transversely flexible sheets, each having one end supported on the spout and the other end supported on the separator housing, whereby they may be twisted as the spout outlet moves out of alignment with the separator housing.

2. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level in combination with a guide throat for orienting the cut crop from the header spout to the level position of the separator housing, said throat comprising upper and lower transversely flexible sheets, each having one end supported on the spout and the other end supported on the separator housing, whereby they may be twisted as the spout outlet moves out of alignment with the separator housing, said header spout having power driven feeding means therein feeding the cut crop through the throat.

3. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level comprising, a turret on which the spout is pivoted, means on the turret rotatably supporting the front end of the separator housing on said turret, an axle extending transversely of and secured to the bottom of the separator housing, a forwardly extending arm pivoted on each end of the axle, wheels supporting the front ends of said arms, turret supports carried on said arms adjacent to the front ends thereof, means on the turret connected to said spout to raise and lower the header about the spout pivot as an axis, and means connected to the turret and the separator housing to turn the front end of the separator housing about its pivotal mounting on the turret.

4. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level comprising, a turret on which the spout is pivoted, means on the turret rotatably supporting the front end of the separator housing on said turret, an axle extending transversely of and secured to the bottom of the separator housing, a forwardly extending arm pivoted on each end of the axle, wheels supporting the front ends of said arms, turret supports carried on said arms adjacent to the front ends thereof, means on the turret to raise and lower the header about the spout pivot as an axis, a hydraulic cylinder having a piston therein and a piston rod secured to the piston and projecting from the cylinder, the lower end of the rod being connected to one end of the turret by a universal joint, and the lower end of the cylinder being connected to the separator housing above the turret by a universal joint, and pressure fluid supply leads to the cylinder above and below the cylinder.

5. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level, said means comprising, supporting wheels between the header and the front end of the separator housing, an arm supported by each wheel and extending rearwardly, the separator housing having an axle on which the rear end of the arm is pivoted, a turret at the front end of the separator housing on which the separator housing is rotatably mounted, the spout being pivoted to said turret, means on the turret supporting the header and operable to raise and lower the header about the spout pivot, means supporting the ends of the turret on said arms, comprising an upright for each arm, the lower end of which is supported on the arm, the ends of the turret being supported on the upper ends of said uprights whereby rise and fall of the wheels cause the turret to rock.

6. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level, said means comprising, supporting wheels between the header and the front end of the separator housing, an arm supported by each wheel and extending rearwardly, the separator housing having an axle on which the rear end of the arm is pivoted, a turret at the front end of the separator housing on which the separator housing is rotatably mounted, the spout being pivoted to said turret, means on the turret supporting the header and operable to raise and lower the header about the spout pivot, means supporting the ends of the turret on said arms, comprising an upright for each arm, the lower end of which is supported on the arm, the ends of the turret being supported on the upper ends of said uprights whereby rise and fall of the wheels cause the turret to rock, and means connecting the separator housing to the turret operable to level the separator housing by rotating the housing on the turret when the turret is rocked out of level position.

7. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level, said means comprising, supporting wheels between the header and the front end of the separator housing, an arm supported by each wheel and extending rearwardly, the separator housing having an axle on which the rear end of the arm is pivoted, a turret at the front end of the separator housing on which the separator housing is rotatably mounted, the spout being pivoted to said turret, means on the turret supporting the header and operable to raise and lower the header about the spout pivot, means supporting the ends of the turret on said arms, and operable to cause the turret to rock in response to rise and fall of one wheel with respect to the other.

8. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level, said means comprising, supporting wheels between the header and the front end of the separator housing, an arm supported by each wheel and extending rearwardly, the separator housing having an axle on which the rear end of the arm is pivoted, a turret at the front end of the separator housing on which the separator housing is rotatably mounted, the spout being pivoted to said turret, means on the turret supporting the header and operable to raise and lower the header about the spout pivot, means supporting the ends of the turret on said arms, and operable to cause the turret to rock in response to rise and fall of one wheel with respect to the other, and an expansible link connecting one side of the separator housing with one end of the turret.

9. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level, said means comprising, supporting wheels between the header and the front end of the separator housing, an arm supported by each wheel and extending rearwardly, the separator housing having an axle on which the rear end of the arm is pivoted, a turret at the front end of the separator housing on which the separator housing is rotatably mounted, the spout being pivoted to said turret, means on the turret supporting the header and operable to raise and lower the header about the spout pivot, means supporting the ends of the turret on said arms, and operable to cause the turret to rock in response to rise and fall of one wheel with respect to the other, and a transversely flexible throat connecting the spout and the separator housing operable to orient the cut crop from various angular positions of the spout to the level position of the separator.

10. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level, in combination with a guide throat for orienting the cut crop from the header spout to the level position of the separator housing said throat comprising upper and lower transversely flexible sheets, each having one end supported on the spout and the other end supported on the separator housing, whereby they may be twisted as the spout outlet moves out of alignment with the separator housing, the lower sheet being secured to the spout and slidably supported on the separator housing, the upper sheet being affixed to the separator housing and slidably supported on the spout.

11. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level, in combination with a guide throat for orienting the cut crop from the header spout to the level position of the separator housing said throat comprising upper and lower transversely flexible sheets, each having one end supported on the spout and the other end supported on the separator housing, whereby they may be twisted as the spout outlet moves out of alignment with the separator housing, said lower sheet having spaced stiffening members thereon extending from the spout supported portion to the separator housing supported portion thereof.

12. In a harvester having a separator housing, a header spaced forwardly from the separator housing, and a header spout fixed to the header and extending from the header rearwardly to the separator housing, supporting mechanism supporting the header and the front end of the separator housing so the header will follow the contour of sloping ground and the separator housing may be kept substantially level, in combination with a guide throat for orienting the cut crop from the header spout to the level position of the separator housing said throat comprising upper and lower transversely flexible sheets, each having one end supported on the spout and the other end supported on the separator housing, whereby they may be twisted as the spout outlet moves out of alignment with the separator housing, an endless conveyor in the spout operable to convey the cut crop on to said lower sheet, and a beater at the spout outlet opposing return of the crop into the spout.

13. In a harvester, a separator housing, a header, a spout extending from the header into the separator housing, a ring at the separator end of the spout, the separator housing being rotatably mounted on said ring, a turret carrying said ring, wheels supporting the turret, means on said turret supporting the header, a hydraulic cylinder having its lower end mounted on the separator housing at one side thereof, a piston in said cylinder, and a piston rod extending out of the cylinder from said piston and secured at its free end to said turret.

14. In a harvester having a separator, a housing for the separator, a header spaced forwardly from the separator housing, and a header spout extending from the header rearwardly to the separator housing, supporting mechanism supporting the separator housing at its front end and supporting the header so that the header will follow the contour of sloping ground while the separator housing is kept substantially level, the supporting mechanism comprising a turret on which the spout is pivoted to swing up and down, the separator having its front end rotatably mounted on the turret to rotate about an axis extending longitudinally of the separator, means connecting the turret and the housing to turn the separator housing on the turret, an arm pivoted to the separator housing at each side thereof and extending forwardly toward the header, a ground engaging support carrying the front end of each arm, an upright for each arm having its lower end suspended on the arm adjacent the front end thereof and extending upwardly to the turret, and links suspending the turret on the upper ends of said arms.

References Cited in the file of this patent

UNITED STATES PATENTS

| | | |
|---|---|---|
| 2,251,655 | Bostic | Aug. 5, 1941 |
| 2,504,289 | Waterman | Apr. 18, 1950 |
| 2,583,016 | Ritter et al. | Jan. 22, 1952 |
| 2,656,668 | Witzel | Oct. 27, 1953 |